US006406788B1

(12) United States Patent
Doi et al.

(10) Patent No.: US 6,406,788 B1
(45) Date of Patent: Jun. 18, 2002

(54) ELASTIC POLYURETHANE FIBER

(75) Inventors: Masanori Doi; Akihiko Yoshizato, both of Moriyama (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/762,442

(22) PCT Filed: Aug. 5, 1999

(86) PCT No.: PCT/JP99/04240

§ 371 (c)(1),
(2), (4) Date: Feb. 8, 2001

(87) PCT Pub. No.: WO00/09789

PCT Pub. Date: Feb. 24, 2000

(30) Foreign Application Priority Data

Aug. 10, 1998 (JP) ........................................... 10-226097
Aug. 11, 1998 (JP) ........................................... 10-226770

(51) Int. Cl.[7] .................................................. D01F 6/00
(52) U.S. Cl. ........................ 428/364; 428/372; 428/384
(58) Field of Search ................................. 428/364, 372, 428/394; 523/200, 206, 209, 216

(56) References Cited

U.S. PATENT DOCUMENTS

| | | | |
|---|---|---|---|
| 4,340,527 A | | 7/1982 | Martin ........................ 524/432 |
| 4,525,420 A | | 6/1985 | Imai et al. ................... 428/372 |
| 5,447,969 A | * | 9/1995 | Kojima et al. ............... 523/200 |
| 5,969,008 A | * | 10/1999 | Hutte et al. ................. 523/206 |

FOREIGN PATENT DOCUMENTS

| | | |
|---|---|---|
| EP | 0 843 029 A1 | 5/1998 |
| GB | 2 080 349 | 2/1982 |
| JP | 59133248 A | 7/1984 |
| JP | 60-43444 | 9/1985 |
| JP | 61-35283 | 8/1986 |
| JP | 5-59268 | 3/1993 |
| JP | 06081215 A | 3/1994 |
| JP | 11323662 A | 11/1999 |
| JP | 2000282328 A | 10/2000 |
| WO | WO93/06173 | 4/1993 |

* cited by examiner

*Primary Examiner*—N. Edwards
(74) *Attorney, Agent, or Firm*—Finnegan, Henderson, Farabow, Garrett & Dunner, L.L.P.

(57) ABSTRACT

An elastic polyurethane fiber excellent in chlorine resistance, which contains particles of a metal compound selected from oxides and hydroxides of a metal selected from zinc and magnesium, and composite oxides of zinc and magnesium, a treating agent selected from a fatty acid, a styrene/maleic anhydride copolymer or its esterified products and a phosphoric ester adhering to the surface of the particles. The elastic polyurethane fiber is appropriate for an elastic fiber material for swimwear used in a swimming pool. The elastic polyurethane fiber can be produced by spinning a polyurethane spinning dope containing the metal compound particles to which such a specific treating agent as mentioned above adheres. The spinning dope suppresses secondary agglomeration of the metal compound particles and enables stabilized spinning of a modified polyurethane fiber.

6 Claims, No Drawings

ELASTIC POLYURETHANE FIBER

TECHNICAL FIELD

The present invention relates to an elastic polyurethane fiber and a process for producing the same. The present invention relates, in more detail, to an elastic polyurethane fiber which hardly deteriorates in various chlorinated water environments and, particularly, which is excellent in chlorine resistance characteristics when used in swimwear in a swimming pool containing germicidal chlorine, and a process for stably producing the fiber.

BACKGROUND ART

An elastic polyurethane fiber obtained from an aromatic diisocyanate, a polyalkylene glycol and a polyfunctional hydrogen-containing compound has a high rubber elasticity, and is excellent in mechanical properties such as tensile stress and resilience, and thermal properties. Accordingly, the elastic polyurethane fiber as a stretchable functional fiber material has been widely used for such fiber products required to have stretchability as swimwear, foundation garments, stockings and sportswear.

In general, when clothing products in which an elastic polyurethane fiber is used are repeatedly washed by immersing them in a chlorine bleaching agent over a long period of time, the elastic polyurethane fiber is known to lose its elastic function. For example, when swimwear in which an elastic polyurethane fiber is used is repeatedly exposed to germicidal chlorinated water having an active chlorine concentration from 0.5 to 3 ppm, in a swimming pool or the like, the elastic function thereof is significantly impaired or yarn breakage is likely to take place. In particular, it is known that for swimwear comprising a polyamide fiber and an elastic polyurethane fiber, fading of color of dyeing tend to occur.

In order to improve the chlorine resistance of an elastic polyurethane fiber, a polyester-based elastic polyurethane fiber prepared by using an aliphatic polyester diol as a starting material has been employed. However, its chlorine resistance has been insufficient. Moreover, since an aliphatic polyester has a high biological activity, the polyester-based polyurethane has a disadvantage of being likely to be attacked by fungi. The polyester-based polyurethane therefore has the problem that the elastic function of the swimwear lowers during its use or storage and yarn breakage tends to take place.

Although an elastic polyether-based polyurethane fiber prepared by using as a starting material a polyether diol having an extremely low biological activity is not degraded by fungi, its chlorine resistance is still poorer than the polyester-based polyurethane. Various additives for improving chlorine-caused deterioration of the elastic polyether-based polyurethane fiber, namely, anti-chlorine agents have been proposed. For example, Japanese, Examined Patent Publication (Kokoku) No. 60-43444 discloses zinc oxide; Japanese Examined Patent Publication (Kokoku) No. 61-35283 discloses magnesium oxide, aluminum oxide, etc.; Japanese Unexamined Patent Publication (Kokai) No. 59-133248 discloses magnesium hydroxide, etc.; Japanese Unexamined Patent Publication (Kokai) No. 6-81215 discloses solid solution of magnesium oxide and zinc oxide.

The effects of magnesium oxide and aluminum oxide on the prevention of the chlorine-caused deterioration which are disclosed in Japanese Examined Patent Publication (Kokoku) No. 61-35283 are insignificant compared with comparative examples as shown in Table 1 on page 4 of the Patent Gazette (refer to Table 1 on page 4 of the Patent Gazette). Zinc oxide disclosed in Japanese Examined Patent Publication (Kokoku) No. 60-43444 has the problem that the elastic polyether-based polyurethane fiber markedly loses its chlorine resistance because the zinc oxide component is eluted from the fiber during dyeing under an acid condition (pH 3 to 6) and the retained zinc oxide content in the fiber significantly decreases. The use of the solid solution of magnesium oxide and zinc oxide disclosed in Japanese Unexamined Patent Publication (Kokai) No. 6-81215 and that of magnesium hydroxide, etc. disclosed in Japanese Unexamined Patent Publication (Kokai) No. 59-133248 produce little effect of improving the prevention of chlorine-caused deterioration, similarly to zinc oxide, and the effect is at an unsatisfactory level.

For swimwear comprising an elastic polyurethane fiber and a polyamide fiber, in order to prevent fading of dyeing used in the swimwear with chlorine contained in the water of a pool, the swimwear subsequent to dyeing is subjected to dye-fixation treatment with a fixation agent such as tannin. When an elastic polyurethane fiber containing a known anti-chlorine agent such as zinc oxide, magnesium oxide or a solid solution of magnesium oxide and zinc oxide is dyed under an acid condition (pH 3 to 6), the chlorine resistance of the fiber is lowered. Moreover, when dyed swimwear, etc., is subjected to dye-fixation treatment with a tannin solution or the like under an acid condition (pH 3 to 4.5), the chlorine resistance of the elastic polyurethane fiber is further lowered.

On the other hand, when these anti-chlorine agents are added to a polyurethane spinning dope or a molten polyurethane, secondary agglomeration of the agents takes place, and clogging of the spinning filter or yarn breakage during spinning increases. The use of zinc oxide having a particle size of 0.1 to 1 $\mu$m is disclosed in Japanese Examined Patent Publication (Kokoku) No. 60-43444; the use of magnesium oxide having a particle size of 5 $\mu$m or less is disclosed in Japanese Examined Patent Publication (Kokoku) No. 61-35283; the use of a solid solution of magnesium oxide and zinc oxide having a particle size of 0.05 to 3 $\mu$m is disclosed in Japanese Unexamined Patent Publication (Kokai) No. 6-81215. However, none of these known methods refer to the technologies of decreasing clogging of a spinning filter and reducing yarn breakage during spinning caused by secondary agglomeration of an anti-chlorine agent, etc.

DISCLOSURE OF THE INVENTION

An object of the present invention is to provide an elastic polyurethane fiber which hardly deteriorates in chlorinated water environments, which can be dyed under an acid condition (pH 3 to 6), and which shows excellent chlorine resistance even when dyed under an acid condition (pH 3 to 6), or when dyeing is subjected to dye-fixation treatment under an acid condition after dyeing, and a process for stably producing the elastic polyurethane fiber.

The present inventors have made the discoveries explained below. The simultaneous presence in the fiber of specific metal compound particles added as an anti-chlorine modifier to the polyurethane and a treating agent selected from fatty acids, styrene/maleic anhydride copolymers, esterified products of a styrene/maleic anhydride copolymer and phosphoric esters makes the elastic polyurethane fiber show excellent chlorine resistance regardless of whether the fiber is dyed or not, in comparison with an elastic polyurethane fiber containing the known anti-chlorine agent as mentioned above. Moreover, the treating agent shows higher chlorine resistance when it adheres to the surface of the metal compound particles. In particular, when the metal compound particles which are an anti-chlorine agent and to which the treating agent is allowed to adhere in advance prior to spinning, and contained in the spinning dope, the elastic polyurethane fiber having properties mentioned above can astonishingly be produced under stabilized spinning operation in which filter clogging and yarn breakage during spinning caused by secondary agglomeration of the metal compound particles in the spinning dope are reduced.

The present invention provides an elastic polyurethane fiber comprising metal compound particles that satisfy the following conditions (a), and a treating agent that satisfies the following conditions (b):

(a) particles of one or more metal compounds selected from the group consisting of oxides and hydroxides of one or more metals selected from Zn and Mn, and composite oxides of Zn and Mg;

(b) one or more treating agents selected from the group consisting of fatty acids, styrene/maleic anhydride copolymers, esterified products of a styrene/maleic anhydride copolymer and phosphoric esters represented by the following formula (3):

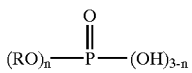

(3)

wherein R is a linear or branched alkyl group of 1 to 30 carbon atoms, an alkoxy polyoxyalkylene group, a cycloalkyl group of 5 to 6 carbon atoms, a cycloalkyl group of 5 to 6 carbon atoms substituted by an alkyl group of 1 to 10 carbon atoms, and a group formed by bonding an alkyleneoxy group having from 1 to 10 repeating units each having 2 to 3 carbon atoms to an alkyloxy group of 8 to 18 carbon atoms, and n is an integer of 1 to 2.

Furthermore, the present invention provides a process for producing an elastic polyurethane fiber containing metal compound particles that satisfy the above conditions (a), the process comprising spinning a polyurethane spinning dope that contains, based on the polyurethane, 0.5 to 10% by weight of the metal compound particles having a treating agent adhering thereto that satisfies the above conditions (b).

In the present invention, the metal compound is an oxide or a hydroxide of a metal selected from Zn and Mg, or a composite oxide of Zn and Mg. Examples of the metal compound include zinc oxide, magnesium oxide, zinc hydroxide, a solid solution of zinc oxide and magnesium oxide and a eutectoid of above oxides, etc. These metal compounds may be used singly, or a mixture of two or more of them may also be used. Of these substances, zinc oxide and magnesium oxide are preferably used.

Examples of the treating agent used in the present invention include fatty acids, esters of fatty acid, styrene/maleic anhydride copolymers and their derivatives, phosphoric esters, silane coupling agents, titanate coupling agents, or a mixture of these compounds.

The aliphatic acids include, for example a mono- or dicarboxylic acid having a linear or branched alkyl group of 10 to 30 carbon atoms. The fatty acids include capric acid, lauric acid, myristic acid, palmitic acid, stearic acid and behenic acid. Moreover, the treating agent may also be an ester of fatty acid. The ester of fatty acid include, for example, esters of the above fatty acids and mono- or polyvalent alcohols having a linear or branched alkyl group of 1 to 30 carbon atoms. Examples of the esters include glyceryl monostearate, stearyl oleate and lauryl oleate. Fatty acids are more effective than esters of fatty acid. In particular, linear or branched fatty acids of 10 to 20 carbon atoms are preferred, and stearic acid is most preferred.

Appropriate examples of the styrene/maleic anhydride copolymer include a copolymer of the formula (4) but the stylene portion in the formula (4) may be copolymer of polymerized stylene with maleic anhydride, or n in the formula (4) may be in a range from 3 to 20.

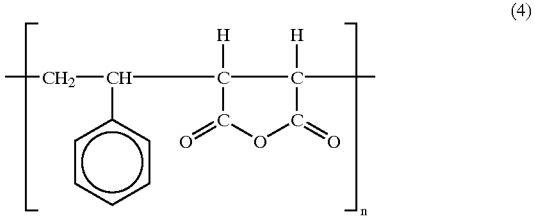

(4)

wherein n is from 6 to 8.

Furthermore, the styrene portion in the formula (4) may also be a linear or branched alkyl group of 2 to 20 carbon atoms.

Examples of the styrene/maleic anhydride copolymer derivatives include esterified derivatives (esterification of the maleic anhydride portion with an alcohol), sulfonated derivatives (sulfonation of the styrene portion), imide derivatives (imide formation of the maleic anhydride portion with an amine) and copolymers with an unsaturated alcohol. Of various derivatives, esterified derivatives are most preferred, and an alcohol used for the esterification desirably has a linear or branched alkyl group of 3 to 20 carbon atoms. One example of the esterified derivatives is shown by the formula (5):

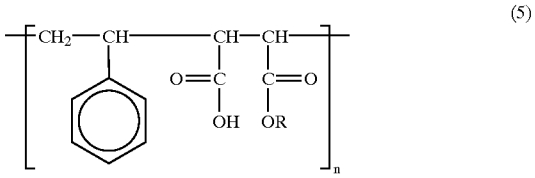

(5)

wherein R is a 1/1 mixture of R1 and R2, R1 is an isopropyl group, R2 is an n-hexyl group, and n is from 6 to 8.

Furthermore, the styrene portion in the formula (5) may also be a linear or branched alkyl group of 2 to 20 carbon atoms.

One example of the copolymer with an unsaturated alcohol is a graft polymer of a styrene/maleic anhydride/allyl alcohol copolymer with a polyoxyalkylene

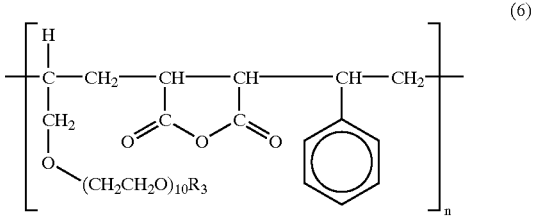

(6)

wherein R3 is an n-butyl group, and n is from 20 to 40.

Furthermore, the styrene portion in the formula (6) may also be a linear or branched alkyl group of 2 to 20 carbon atoms.

The phosphoric esters can be represented by the formula (7):

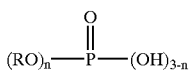

(7)

wherein R is a linear or branched alkyl group of 1 to 30 carbon atoms, an alkoxy polyoxyalkylene group, a cycloalkyl group of 5 to 6 carbon atoms, a cycloalkyl group of 5 to 6 carbon atoms substituted by an alkyl group of 1 to 10 carbon atoms, and a group formed by bonding an alkylene group having from 1 to 10 repeating units each having 2 to 3 carbon atoms to an alkyloxy group of 8 to 18 carbon atoms, and n is an integer of 1 to 2.

Examples of the phosphoric esters include mono- or dimethyl acid phosphate, mono- or diethyl acid phosphate, mono- or dipropyl acid phosphate, mono- or diisopropyl acid phosphate, mono- or dibutyl acid phosphate, mono- or dilauryl acid phosphate, mono- or distearyl acid phosphate, mono- or di(2-ethylhexyl) acid phosphate, mono- or diisodecyl acid phosphate, mono- or dibutoxyethyl acid phosphate, mono- or dioleyl acid phosphate, mono- or ditetracosyl acid phosphate, mono- or di(2-hydroxylethyl) methacrylate acid phosphate and polyoxyalkylene glycol alkylene ether acid phosphate. These monoester-based phosphoric esters and diester-based phosphoric esters can be used singly or in a mixture. Moreover, a few different phosphoric esters can also be used in a mixture.

Of the phosphoric esters in which R of the above formula has from 1 to 30 carbon atoms, phosphoric esters in which R has from 3 to 25 carbon atoms are preferred. Phosphoric esters in which R has from 10 to 20 carbon atoms are more preferred. Mono- or distearyl acid phosphate, mono- or dilauryl acid phosphate and mono- or dioleyl acid phosphate are appropriate.

Silane coupling agents and titanate coupling agents also adhere to the metal compounds of the invention so that the metal compounds exhibit their effects. Examples of the silane coupling agents include γ-glycidoxypropyltrimethoxysilane, γ-mercaptopropyltrimethoxysilane and N-β-(aminoethyl)-γ-aminopropyltrimethoxysilane. Examples of the titanate coupling agents include isopropyl triisostearoyl titanate, isopropyl tris(dioctyl pyrophosphate)titanate and isopropyl tridecylbenzenesulfonyl titanate.

Various treating agents mentioned above are used singly or in a mixture of two or more of them.

Of the treating agents exemplified above, fatty acids, styrene/maleic anhydride copolymers, esters of a styrene/maleic anhydride copolymer and phosphoric esters are desirably used. The metal compounds in the present invention are disclosed as additives for preventing chlorine-caused deterioration of elastic polyurethane fibers in Japanese Examined Patent Publication (Kokoku) Nos. 60-43444 and 61-35283 and Japanese Unexamined Patent Publication (Kokai) Nos. 59-133248 and 6-81215. However, these anti-chlorine agents are eluted from the polyurethane fiber or lose their activity as additives when the polyurethane fiber is dyed under an acid condition or subjected to dye-fixation treatment such as tannin treatment that has been widely conducted in mixed knitting with a polyamide fiber; as a result, the polyurethane fiber suffers deterioration of chlorine resistance at an early stage. For example, when the polyurethane fiber is used for swimwear in a swimming pool, the elastic function is damaged, and the swimwear comes to have a poor wearing feeling or shows yarn breakage during wearing. Japanese Examined Patent Publication (Kokoku) No. 60-43444 suggests on page 5 that zinc oxide is deactivated or dissolved to lower its chlorine resistance during dyeing. The present inventors have made the following clear for the first time: an elastic polyurethane fiber containing the above metal compound particles to which a specific treating agent adheres shows significantly improved chlorine resistance even when the fiber is dyed or subjected to tannin solution treatment; moreover, when the treating agent is allowed to adhere to the metal compound particles prior to spinning, filter clogging and yarn breakage during spinning caused by secondary agglomeration of the metal compound particles in the spinning dope extremely seldom take place, and the elastic polyurethane fiber can be stably produced over a long period of time.

Using various known procedures, one or more treating agents selected from fatty acids, styrene/maleic anhydride copolymers, esterified products of a styrene/maleic anhydride copolymer and phosphoric esters can be allowed to adhere to metal compound particles in the present invention by various methods including the methods (1) to (5) exemplified below.

In a step prior to allowing the polyurethane to contain the metal compound, the methods include:
  (1) a method comprising mixing and heating the metal compound and the treating agent; and
  (2) a method comprising dissolving or dispersing the treating agent in a solvent, directly spraying the dispersed or dissolved treating agent on or mixing it with the metal compound, and removing the solvent.

In the step of producing the elastic polyurethane fiber, the methods include: (3) a method comprising dissolving or dispersing the treating agent in a solvent for the polyurethane so that the treating agent adheres to the metal compound, and allowing the polyurethane dope to contain the metal compound, or directly adding the treating agent to the polyurethane solution containing the metal compound and mixing the treating agent with the solution so that the treating agent adheres to the metal compound; and (4) a method comprising dissolving or dispersing the treating agent in finish oil during spinning and winding the elastic polyurethane fiber, and allowing the treating agent and finish oil to adhere to the fiber. Moreover, in the step of processing a knitted fabric formed from the elastic polyurethane fiber and another synthetic fiber, the methods include: (5) a method comprising treating a knitted union fabric of an elastic polyurethane fiber that contains the metal compound, and a polyamide fiber with a solution or dispersion liquid in which the treating agent is dissolved or dispersed, prior to dyeing or dye-fixation treatment with a tannin solution or the like, so that the treating agent is allowed to adhere to the metal compound.

It is evident from the above examples that there is no limitation on the time and means for allowing the treating agent to adhere to the metal compound. Moreover, as to the methods of allowing the treating agent to adhere thereto, some of the above methods can be combined and applied to achieve the adhesion. The adhesion methods (1) to (4) that can uniformly and efficiently allow the treating agent to adhere to the particle surface of the metal compound are preferred. The methods (2) to (3) are more preferred.

Specific examples of methods of allowing the treating agent to adhere to the metal particles include: a method comprising placing the metal compound particles and lauric acid in an amount of 4% by weight based on the metal compound particles in a Henschel mixer, and heating and stirring the mixture; a method comprising mixing the metal compound particles and a solution of 1% by weight, based on the metal compound particles, of stearic acid in 10% by weight of methanol at room temperature, in a Henshel mixer, and removing methanol without further processing by evaporation at 100° C.; a method comprising dispersing the metal compound particles with a homomixer in a solution of esterified products of a styrene/maleic anhydride copolymer of the formula (2) in an amount of 4% by weight based on the metal compound particles in dimethylacetamide that is a solvent for the polyurethane; a method comprising placing in a Henschel mixer the metal compound particles and lauryl acid phosphate (mono:di=1:2) in an amount of 4% by weight based on the metal compound particles, and heating at 70° C. and stirring the mixture; and a method comprising mixing at room temperature by a Henschel mixer the metal compound particles and a solution of 2% by weight, based on the metal compound particles, of stearyl acid phosphate (mono:di=1:1) in 4% by weight of methanol, and removing methanol without further processing by evaporation at 100° C.

It is thought that the treating agent adheres to the metal compound particles because the treating agent is physically or chemically adsorbed to the metal compound particle surface to form a firm coating on the surface. The effects of the present invention are thought to be produced for the following reasons: the surface coating not only protects the basic metal compound from a dye-fixation solution such as an acidic dyeing solution and an acidic tannin solution to prevent elution and deactivation of the metal compound caused by salt formation due to the contact thereof with the dye-fixation solution such as the dyeing solution and tannin, but also suppresses secondary agglomeration of the metal compound particles to be caused by intermolecular force among the particles in the polyurethane spinning dope when the treating agent is allowed to adhere to the particles prior to spinning.

An amount of the treating agent is preferably from 0.5 to 10% by weight based on the metal compound particles. When the amount is less than 0.5% by weight, not only the amount of adhesion is small and the improvement effects on the chlorine resistance are insignificant, but also the effects on preventing filter clogging caused by agglomeration of the metal compound particles and yarn breakage during spinning are insignificant when the treating agent is allowed to adhere at a step prior to spinning. When the amount of the treating agent exceeds 10% by weight, the excessive portion of the treating agent lowers the viscosity of the polyurethane spinning dope to induce yarn breakage during spinning and decrease the elastic function of the elastic polyurethane fiber, and it also deteriorates the chlorine resistance.

Metal compound particles to which the treating agent adheres in an effective amount are contained in the fiber preferably in an amount of 0.5 to 10% by weight based on the polyurethane. When the amount is less than 0.5% by weight, the fiber shows insufficient chlorine resistance. Moreover, when the amount exceeds 10% by weight, the fiber shows insignificant effects of improving the chlorine resistance, and the addition amount is uneconomic. A preferred amount of the metal compound particles is from 2 to 8% by weight.

When the metal compound particles to which the treating agent adheres in an effective amount in the present invention have a smaller particle size, they exert more effect on the chlorine resistance of the elastic polyurethane fiber; when the treating agent is allowed to adhere thereto prior to spinning, filter clogging and yarn breakage during spinning are decreased, and the production stability of the elastic polyurethane fiber is increased. An average particle size of 5 $\mu$m or less is preferred.

The polyurethane used in the present invention is produced from, for example, a polymer glycol having hydroxyl groups at both molecular ends (both terminal ends) and a number average molecular weight of 600 to 5,000, an organic diisocyanate, a chain extender having polyfunctional active hydrogen atoms and a chain terminator having a monofunctional active hydrogen atom.

Examples of the polymer glycol include a homopolyether diol such as polyoxyethylene glycol, polyoxypropylene glycol, polyoxytetramethylene glycol and polyoxypentamethylene glycol, a copolymerized polyether diol formed from two or more oxyalkylenes each having from 2 to 6 carbon atoms, a polyester diol obtained from one or two or more dibasic acids such as adipic acid, sebacic acid, maleic acid, itaconic acid, azelaic acid and malonic acid, and one or two or more glycols such as ethylene glycol, 1,2-propylene glycol, 1,3-propylene glycol, 2,2-dimethyl-1,3-propanediol, 1,4-butanediol, 1,3-butanediol, hexamethylene glycol, diethylene glycol, 1,10-decanediol, 1,3-dimethylolcyclohexane and 1,4-dimethylolcyclohexane, a polyesteramide diol, a polyester ether diol, a polylactonediol such as poly-ε-caprolactonediol and polyvalerolactonediol, polycarbonate diol, polyacryl diol, polythioether diol, polythioester diol and copolymerized products or a mixture of these diols.

Examples of the organic diisocyanate include methylenebis(4-phenyl isocyanate), methylenebis(3-methyl- 4-phenyl isocyanate), 2,4-tolylene diisocyanate, 2,6-tolylene diisocyanate, m- and p-xylylene diisocyanate, $\alpha,\alpha,\alpha',\alpha'$-tetramethylxylylene diisocyanate, m- and p-phenylene diisocyanate, 4,4'-dimethyl-1,3-xylylene diisocyanate, 1-alkylphenylene-2,4- and 2,6-diisocyante, 3-($\alpha$-isocyanatoethyl)phenyl isocyanate, 2,6-diethylphenylene-1,4-diisocyanate, diphenyldimethylmethane-4,4-diisocyanate, diphenylether-4,4'-diisocyanate, naphthylene-1,5-diisocyanate, 1,6-hexamethylene diisocyanate, methylenebis(4-cyclohexyl isocyanate), 1,3- and 1,4-cyclohexylene diisocyanate, trimethylene diisocyanate, tetramethylene diisocyanate, pentamethylene diisocyanate, hexamethylene diisocyanate and isophorone diisocyanate and the like, or a mixture of these compounds. Aromatic diisocyanates are preferably used for the elastic polyurethane fiber.

Examples of the chain extender having polyfunctional active hydrogen atoms include hydrazine, polyhydrazine, such an aliphatic compound (linear or branched, having 2 to 10 carbon atoms), an alicyclic compound and an aromatic compound having an amino group that has an active hydrogen as ethylenediamine and 1,2-propylenediamine, such a diamine having a urea group as described in Japanese Unexamined Patent Publication (Kokai) No. 5-155841, hydroxylamine, water, a low molecular weight glycol such as ethylene glycol, 1,2-propylene glycol and 1,3-propylene glycol, 2,2-dimethyl-1,3-propanediol, 1,4-butanediol, 1,3-butanediol, hexamethylene glycol, diethylene glycol, 1,10-decanediol, 1,3-dimethylolcyclo-hexane and 1,4-dimethylolcyclohexane and the like. Of these compounds, ethylenediamine and 1,2-propylenediamine are preferred.

Examples of the terminator having a mono-functional active hydrogen atom include a dialkylamine such as diethylamine and an alkyl alcohol such as ethanol. These chain extenders and terminal stoppers are used singly or in a mixture of two or more of them.

Known techniques for polyurethane-forming reactions can be applied to the preparation of the polyurethane. For example, a polyalkylene glycol and an aromatic diisocyanate are reacted under the condition that the aromatic diisocyanate is present in an excessive amount, and the resultant products are dissolved in a polar solvent such as dimethylacetamide to give a polyurethane prepolymer solution; the prepolymer is subsequently reacted with a chain extender and a chain terminator stopper to give a polyurethane solution.

The metal compound particles or metal compound particles to which a treating agent adheres are usually added to the polyurethane solution. However, they can also be added to starting materials for the polyurethane in advance, or they can also be added during a reaction of a polyurethane prepolymer and a chain-extending reaction.

Such compounds other than the metal compounds in the present invention usually used for the elastic polyurethane fiber as ultraviolet ray absorbers, antioxidants, stabilizers, gas-resistant stabilizers, coloring agents, delustering or matting agents and fillers may be added to the polyurethane solution.

The polyurethane solution thus obtained can be formed into a fibrous shape by a known procedure such as dry spinning or wet spinning to give an elastic polyurethane fiber.

The following substances may be applied to the elastic polyurethane fiber: polydimethylsiloxanes, polyester-modified silicones, polyether-modified silicones, amino-modified silicones, a mineral oil, fine mineral particles such as silica, colloidal alumina and talc or the like, powders of metal salts of higher fatty acids such as magnesium stearate and calcium stearate and the like, and a finish oil, which is a solid wax, etc. at room temperature, such as a higher aliphatic carboxylic acid, a higher aliphatic alcohol, paraffin and polyethylene and the like. These substances may be used singly or in an optional combination thereof if necessary.

The elastic polyurethane fiber of the present invention may be used as a bare spandex yarn without further processing, or it may be used as a covered elastic fiber by covering it with another fiber, for example, a polyamide fiber such as N6 and N66, a fiber of polyester such as polyethylene terephthalate, polytrimethylene terephthalate, polytetramethylene terephthalate and various copolymerized polyterephalate, an acrylic fiber, wool, cotton, a regenerated fiber and another known fiber.

The elastic polyurethane fiber of the present invention can be appropriately used in particular for racing swimwear used in swimming pools. However, the application is not restricted thereto. It can also be used for common swimwear, tights, pantyhose, foundation garments, socks, rib tops, corsets, bandages, various sportswear and the like.

BEST MODE FOR CARRYING OUT THE INVENTION

The present invention will be concretely explained below by making reference to examples. However, the present invention is not restricted thereto.

Various evaluation methods, pretreatments and measurement methods in the examples will be described below.

[1] Measurement of Breaking Strength

The tensile breaking strength of a test yarn having a sample length of 5 cm is measured at a tensile rate of 50 cm/min at 20° C. and a relative humidity of 65% using a tensile testing machine (trade name of UTM-100 Type, manufactured by Orientech K.K.).

[2] Measurement of Available Chlorine Concentration

A chlorinated water sample in an amount of 25 ml is weighed and placed in a 100-ml Erlenmeyer flask, and 2 g of potassium iodide having been dried is added thereto and mixed therewith by shaking the flask. The mixture is titrated with a 1/100 N sodium thiosulfate solution and a solution of starch is added thereto at the time when the solution turns pale yellow from orange. The resultant solution is titrated with the 1/100 N sodium thiosulfate solution until a blue color resulting from an iodostarch reaction disappears. Separately, 25 ml of ion-exchanged water is sampled, and titrated in the same manner as explained above to give a blank titration amount. The available chlorine concentration H is obtained from the formula (8):

$$H=(0.003545(Vs-Vb)\times f)/Ws\times 10^6 \qquad (8)$$

wherein H is an available chlorine concentration (ppm), Vs is a titration amount (ml) of the 1/100 N sodium thiosulfate solution when the chlorinated water is titrated, Vb is a titration amount (ml) of the 1/100 N sodium thiosulfate solution when the ion-exchanged water is titrated, f is the titer of the 1/100 N sodium thiosulfate solution, and Ws is a weight (g) of the chlorinated water.

[3] Dyeing

A dye (Irgalan Black BGL 200 manufactured by Bayer Ltd.) in an amount of 2% by weight based on the amount of a sample (fiber to be dyed) and 12 g of ammonium sulfate are dissolved in 9 liters of ion-exchanged water, and the pH of the dyeing solution is adjusted to 4.5 with acetic acid. The sample, while being elongated by 50%, is heat set at 185° C. for 1 minute, and subsequently dyed at 95° C. for 40 minutes. The sample is then washed with flowing service water for 10 minutes, and air dried at 20° C. for a whole day.

[4] Tannin Treatment

To 6 liters of ion-exchanged water are added 4.5 g of tannic acid (trade name of Hi-fix SLA, manufactured by Dainippon Pharmaceutical Co., Ltd.) and acetic acid to adjust the pH to 3.8. The sample having been dyed above is placed in the resultant treating solution at 25° C. while being elongated by 50%. The treating solution is then heated to 90° C., and the sample is immersed therein for 30 minutes, followed by washing the sample with flowing service water for 10 minutes. The test yarn having been treated with the tannin solution is air dried at 20° C. for a whole day.

The breaking strength of the yarn is measured, and the tenacity retention ratio $\Delta T_0$ is calculated according to the formula (9):

$$\Delta T_0=T/T_0\times 100 \qquad (9)$$

wherein $\Delta T_0$ is a tenacity retention ratio (%), T is a tenacity (g) subsequent to the treatment, and $T_0$ is a tenacity (g) prior to the treatment.

A sample yarn having a larger tenacity retention ratio less loses its elastic function when subjected to dyeing treatment and tannin solution treatment.

[5] Evaluation of Chlorine Resistance

A solution of sodium hypochlorite (manufactured by Sasaki Yakuhin K.K.) is diluted with ion-exchanged water so that the available chlorine concentration becomes 3 ppm. The pH of the solution is adjusted to 7 with a buffer solution of citric acid and sodium hydrogenphosphate. A sample treated with a tannin solution is immersed in the solution at 30° C. while the sample is being elongated by 50%. Part of the sample is periodically taken every 8 hours (1 cycle). The breaking strength of the part is measured, and the tenacity retention ratio $\Delta T$ is calculated according to the formula (10):

$$\Delta T=TS/TS_0\times 100 \qquad (10)$$

wherein $\Delta T$ is a tenacity retention ratio (%), TS is a tenacity (g) subsequent to the treatment, and $TS_0$ is a tenacity (g) prior to the treatment.

The chlorine resistance is evaluated from the time $\tau_{1/2}$ (hr) consumed until the tenacity retention ratio lowers to 50%. A larger $\tau_{1/2}$ (hr) signifies that the chlorine resistance is more excellent.

[6] Evaluation of Spinning Dope with Regard to Filter Clogging

A polyurethane spinning dope is passed through a filter (10 μm, trade name of Naslon Filter, manufactured by Nippon Seisen Co., Ltd.) having a diameter of 17 mm, at a constant flow rate of 2 l/hr, and from the dope supply pressure after 0.1 hr and 2 hr, the filter clogging pressure rise rate ΔP is calculated from the formula (11):

$$\Delta P = (P_2 - P_1)/P_1 \times 100 \quad (11)$$

wherein $P_1$ is a dope supply pressure (kg/cm$^2$) after supplying the dope for 0.1 hr, and $P_2$ is a dope supply pressure (kg/cm$^2$) after supplying the dope for 2 hr. Larger ΔP signifies that the filter clogging is more significant.

[7] Evaluation of Spinning Stability

A polyurethane spinning dope is passed through a filter (40 μm, trade name of Naslon Filter, manufactured by Nippon Seisen Co., Ltd.), and the dope is dry spun by extruding the dope through 4 orifices each having a diameter of 0.2 mm to form an elastic polyurethane fiber having 40 denier/4 filaments. The fiber is once wound at a winding rate of 300 m/min for 3 minutes; the winding rate is gradually increased, and the spinning stability is evaluated by a limit denier per single filament calculated from the formula (12):

$$\text{Limit single filament denier } (d) = 40/4 \times 300/x \quad (12)$$

wherein X is a winding rate (m/min) at the time when yarn breakage takes place within the spinning tube.

A smaller denier per filament (limit single filament denier) signifies that the polyurethane is more excellent in spinning stability.

EXAMPLE 1

Polytetramethylene ether glycol having an average molecular weight of 1,900 in an mount of 1,500 g was reacted with 312 g of 4,4'-diphenylmethane diisocyanate with stirring in a nitrogen gas stream at 60° C. for 90 minutes to give a polyurethane prepolymer having isocyanate groups at both molecular ends. The reaction products were then cooled to room temperature, and 2,500 g of dimethylacetamide was added thereto. The mixture was dissolved to give a solution of polyurethane prepolymer. Ethylenediamine in an amount of 23.4 g and diethylamine in an amount of 3.7 g were subsequently dissolved in 1,570 g of dried dimethylacetamide, and the resultant solution was added to the prepolymer solution at room temperature to give a polyurethane solution having a viscosity of 2,500 P (30° C.).

A 5% by weight solution of stearic acid in ethanol was mixed with ZnO (average particle size of 1 μm or less, manufactured by Hakusui Chemical Industries, Ltd.) by a Henschel mixer at room temperature. The mixture was dried at 100° C. to give ZnO to which 1% by weight of stearic acid adhered.

To dimethylacetamide were added 1% by weight, based on the polyurethane solid component, of 4,4'-butylidenebis-(3-methyl-6-t-butylphenol), 0.5% by weight of 2-(2'-hydroxy-3'-t-butyl-5'-methylphenyl)-5-chlorobenzotriazole and 3% by weight of the above ZnO to which 1% by weight of stearic acid adhered, and dispersed by a homomixer to give a 20 wt. % dispersion liquid, followed by mixing the dispersion liquid with the polyurethane solution to give a polyurethane spinning dope.

The spinning dope was defoamed, and dry spun at a spinning rate of 600 m/min at a hot air temperature of 340° C. to give an elastic polyurethane fiber. Before winding the fiber, a polydimethylsiloxane finish oil in which 1% by weight of magnesium stearate was dispersed (dispersion finish oil having a viscosity of 30 cst at 20° C.) was applied to the elastic polyurethane fiber in an amount of 6% by weight based on the fiber to give a fiber of 40 denier/4 filaments.

EXAMPLES 2, 3

An elastic polyurethane fiber was produced in the same manner as in Example 1 except that MgO or Mg(OH)$_2$ was used in place of ZnO.

EXAMPLES 4, 5

Lauric acid (manufactured by Nacalai Jesque, INC.) or esterified products (manufactured by Elf·Atochem·Japan K.K.) of a styrene/maleic anhydride copolymer represented by the formula (5) were allowed to adhere to ZnO in place of stearic acid in Example 1, in an amount of 2% by weight based on ZnO. An elastic polyurethane fiber was produced in the same manner as in Example 1 except that ZnO as prepared above was used.

EXAMPLE 6

A 5 wt. % solution of stearyl acid phosphate (mono:di= 1:1, trade name of Phoslex A-18, manufactured by Sakai Chemical Industry Co., Ltd.) in ethanol was mixed with ZnO (average particle size of 1 μm or less, manufactured by Hakusui Chemical Industries, L.T.D.) by a Henschel mixer at room temperature. The mixture was dried at 100° C. to give ZnO to which 2% by weight of stearyl acid phosphate adhered. An elastic polyurethane fiber was produced in the same manner as in Example 1 except that the ZnO thus prepared was used in place of ZnO to which 1% by weight of stearic acid adhered in Example 1.

EXAMPLES 7, 8

MgO or Mg(OH)$_2$ was used in place of ZnO in Example 6 to give MgO or Mg(OH)$_2$ to which stearic acid phosphate adhered. An elastic polyurethane fiber was produced in the same manner as in Example 1 except that the MgO or Mg(OH)$_2$ thus prepared above was used in place of ZnO.

EXAMPLES 9, 10

Lauryl acid phosphate (mono:di=1:1, trade name of Phoslex A-12, manufactured by Sakai Chemical Industry Co., Ltd.) or 2-ethylhexyl acid phosphate (mono:di=1:1, trade name of Phoslex A-8, manufactured by Sakai Chemical Industry Co., Ltd.) was used in place of stearyl acid phosphate in Example 6 to give ZnO to which 3% by weight of lauryl acid phosphate or 2-ethylhexyl acid phosphate adhered. An elastic polyurethane fiber was produced in the same manner as in Example 1 except that the ZnO thus prepared above was used in place of ZnO in Example 1.

Comparative Example 1

An elastic polyurethane fiber was produced in the same manner as in Example 1 except that a polyurethane spinning dope was prepared using ZnO to which no stearic acid adhered.

Comparative Example 2

An elastic polyurethane fiber was produced in the same manner as in Example 1 except that ZnO to which stearic acid adhered was not used.

Comparative Examples 3, 4

An elastic polyurethane fiber was produced in the same manner as in Example 1 except that ZnO to which stearic acid in an amount of 0.1% by weight or 20% by weight based on ZnO adhered was used.

Comparative Example 5, 6

ZnO to which stearyl acid phosphate in an amount of 0.1% by weight or 20% by weight based on ZnO adhered was prepared in the same manner as in Example 6. An elastic polyurethane fiber was produced in the same manner as in Example 1 except that the ZnO thus prepared above was used.

The filter clogging and spinning stability of the polyurethane spinning dopes obtained in Examples 1 to 10 and Comparative Examples 1 to 6 were evaluated. The tenacity retention ratio and chlorine resistance of the elastic polyurethane fibers obtained therein were evaluated subsequently to the dyeing and tannin solution treatment. The evaluation results are shown in Tables 1 and 2.

TABLE 1

| | Anti-chlorine agent | | | Content based on polyurethane (wt. %) |
|---|---|---|---|---|
| | Metal compound | Treating agent | Amount of treating agent (based on metal compound) | |
| Example 1 | ZnO | Stearic acid | 1.0 | 3.0 |
| Example 2 | MgO | Stearic acid | 1.0 | 3.0 |
| Example 3 | Mg(OH)$_2$ | Lauric acid | 2.0 | 3.0 |
| Example 4 | ZnO | Lauric acid | 2.0 | 3.0 |
| Example 5 | ZnO | Compound of formula (2) | 2.0 | 3.0 |
| Example 6 | ZnO | Stearyl acid phosphate | 2.0 | 3.0 |
| Example 7 | MgO | Stearyl acid phosphate | 2.0 | 3.0 |
| Example 8 | Mg(OH)$_2$ | Stearyl acid phosphate | 2.0 | 3.0 |
| Example 9 | ZnO | Lauryl acid phosphate | 3.0 | 3.0 |
| Example 10 | ZnO | 2-Ethylhexyl acid phosphate | 3.0 | 3.0 |
| Comp. Ex. 1 | ZnO | — | — | 3.0 |
| Comp. Ex. 2 | — | — | — | 0 |
| Comp. Ex. 3 | ZnO | Stearic acid | 0.1 | 3.0 |
| Comp. Ex. 4 | ZnO | Stearic acid | 20.0 | 3.0 |
| Comp. Ex. 5 | ZnO | Stearyl acid phosphate | 0.1 | 3.0 |
| Comp. Ex. 6 | ZnO | Stearyl acid phosphate | 20.0 | 3.0 |

TABLE 2

| | Filter clogging caused by spinning dope $\Delta P$ (kg/cm$^2$) | Spinning stability Limit single filament denier (d) | Tenacity retention rate after dyeing and tannin solution treatment $\Delta T_0$ (%) | Chlorine resistance tested immersion in 3 ppm chlorinated water after dyeing and tannin solution treatment $\tau_{1/2}$ (Hr) |
|---|---|---|---|---|
| Ex. 1 | 0.8 | 1.2 | 95 | 85 |
| Ex. 2 | 1.2 | 1.4 | 90 | 91 |
| Ex. 3 | 1.4 | 1.6 | 89 | 77 |
| Ex. 4 | 0.9 | 1.4 | 93 | 80 |
| Ex. 5 | 0.6 | 1.2 | 96 | 83 |
| Ex. 6 | 0.7 | 1.3 | 93 | 92 |
| Ex. 7 | 1.3 | 1.6 | 90 | 94 |
| Ex. 8 | 1.6 | 1.5 | 93 | 83 |
| Ex. 9 | 0.8 | 1.5 | 91 | 80 |
| Ex. 10 | 1.2 | 1.4 | 92 | 75 |
| Comp. Ex. 1 | 2.8 | 2.2 | 90 | 38 |
| Comp. Ex. 2 | 0.4 | 1.1 | 96 | 25 |
| Comp. Ex. 3 | 2.5 | 2.1 | 90 | 39 |
| Comp. Ex. 4 | 1.5 | 3.0 | 62 | 48 |
| Comp. Ex. 5 | 2.6 | 2.0 | 91 | 39 |
| Comp. Ex. 6 | 1.4 | 3.4 | 37 | 42 |

EXAMPLE 11

In dimethylacetamide containing 20% by weight of ZnO were dispersed esterified products of a styrene/maleic anhydride copolymer represented by the formula (5) in an amount of 4% by weight based on ZnO by a homomixer for 2 hours to give a dispersion liquid. To dimethylacetamide were added 1% by weight, based on the polyurethane solid component, of 4,4'-butylidenebis-(3-methyl-6-t-butylphenol), 0.5% by weight of 2-(2'-hydroxy-3'-t-butyl-5'-methylphenyl)-5-chlorobenzotriazole and 3% by weight of ZnO to which the esterified products of a styrene/maleic anhydride copolymer adhered (ZnO added using the dispersion liquid prepared above), and dispersed by a homomixer to give a dispersion liquid. The dispersion liquid thus obtained was mixed with the polyurethane solution in Example 1 to give a polyurethane spinning dope. An elastic polyurethane fiber was produced in the same manner as in Example 1.

EXAMPLE 12

An elastic polyurethane fiber was produced in the same manner as in Example 1 except that a spinning dope was prepared by using ZnO to which no stearic acid adhered and that 4% by weight, based on ZnO, of stearic acid was added to and mixed with the spinning dope.

EXAMPLE 13

At the time of winding the polyurethane spinning dope in Comparative Example 1, a finish oil in which 2% by weight, based on the finish oil, of lauric acid was dispersed at 45° C. was applied to the elastic polyurethane fiber, in an amount of 6% by weight based on the elastic polyurethane fiber.

Table 3 shows the results of evaluating the chlorine resistance of the elastic polyurethane fibers obtained in Examples 11 to 13 and Comparative Example 1.

TABLE 3

| | Anti-chlorine agent | | Content | Chlorine resistance tested by immersion |
|---|---|---|---|---|
| | Metal compound | Treating agent | Treated amount (%) (based on metal compound) | based on polyurethane (wt. %) | in 3 ppm chlorinated water after dyeing and tannin solution treatment $\tau_{1/2}$ (Hr) |
| Ex. 11 | ZnO | Compound of the formula (2) | 4.0 | 3.0 | 80 |
| Ex. 12 | ZnO | Stearic acid | 4.0 | 3.0 | 76 |
| Ex. 13 | ZnO | Lauric acid | 3.0 | 3.0 | 67 |
| Comp. Ex. 1 | ZnO | — | — | 3.0 | 38 |

INDUSTRIAL APPLICABILITY

The elastic polyurethane fiber of the present invention has excellent resistance to chlorine-induced deterioration, and exhibits excellent chlorine resistance regardless of whether the fiber is dyed or not. Even when dye-fixation treatment by a tannin solution or the like is applied to the elastic polyurethane fiber of the invention after dyeing, the chlorine resistance and the resistance to discoloration and fading of the fiber are not impaired. The elastic polyurethane fiber of the present invention is therefore extremely appropriate for swimwear to be repeatedly used in a pool containing chlorine over a long period of time.

The polyurethane spinning dope containing a specific metal compound to which a treating agent of the invention adheres extremely seldom causes filter clogging or shows yarn breakage during spinning, and therefore stabilized spinning can be maintained over a long period of time.

What is claimed is:

1. An elastic polyurethane fiber comprising polyurethane, metal compound particles that satisfy the following conditions (a), and a treating agent that satisfies the following conditions (b):
   (a) particles of one or more metal compounds selected from the group consisting of zinc oxide, magnesium oxide, zinc hydroxide, magnesium hydroxide, and a solid solution of zinc oxide and magnesium oxide;
   (b) one or more treating agents selected from the group consisting of fatty acids, styrene/maleic anhydride copolymers, esterified products of a styrene/maleic anhydride copolymer and phosphoric esters represented by the following formula (1):

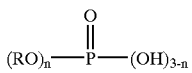
(1)

wherein R is a linear or branched alkyl group of 1 to 30 carbon atoms, an alkoxy polyoxyalkylene group, a cycloalkyl group of 5 to 6 carbon atoms, a cycloalkyl group of 5 to 6 carbon atoms substituted by an alkyl group of 1 to 10 carbons atoms, and a group formed by bonding an alkyleneoxy group having from 1 to 10 repeating units each having 2 to 3 carbon atoms to an alkyloxy group of 8 to 18 carbon atoms, and n is an integer of 1 to 2.

2. The elastic polyurethane fiber according to claim 1, wherein the treating agent adheres to the surface of the metal compound particles.

3. The elastic polyurethane fiber according to claim 1 or 2, wherein the metal compound particles are surface-treated with the treating agent in an amount of 0.5 to 10% by weight based on the metal compound particles, and the surface-treated metal compound particles are contained in an amount of 0.5 to 10% by weight based on the polyurethane.

4. An elastic polyurethane fiber comprising polyurethane, metal compound particles of one or more metal compounds selected from the group consisting of zinc oxide and magnesium oxide, and treating agent that satisfies the following condition (b), in which the metal compound particles are surface treated with the treating agent in an amount of 0.5 to 10% by weight based on the metal compound particles, and the surface-treated metal compound particles are contained in an amount of 0.5 to 10% by weight based on the polyurethane:
   (b) one or more treating agents selected from the group consisting of fatty acids, styrene maleic/anhydride copolymers, esterified products of a styrene/maleic anhydride copolymer, and phosphoric esters represented by the following formula (1);

(1)

wherein R is a linear or branched alkyl group of 1 to 30 carbon atoms, an alkoxy polyoxyalkylene group, a cycloalkyl group of 5 to 6 carbon atoms, a cycloalkyl group of 5 to 6 carbon atoms substituted by an alkyl group 1 to 10 carbon atoms, and a group formed by bonding an alkyleneoxy group having from 1 to 10 repeating units each having 2 to 3 carbon atoms to an alkoxy group of 8 to 18 carbon atoms, and n is an integer of 1 to 2.

5. In a process for producing an elastic polyurethane fiber containing metal compound particles that satisfy the following conditions (a), the process comprising preparing a polyurethane spinning dope containing, based on the polyurethane, 0.5 to 10% by weight of the metal compound particles having a treating agent adhering thereto that satisfies the following conditions (b), and spinning the dope to form the elastic polyurethane fiber:
   (a) particles of one or more metal compounds selected from the group consisting of zinc oxide, magnesium oxide, zinc hydroxide, magnesium hydroxide, and a solid solution of zinc oxide and magnesium oxide;
   (b) one or more treating agents selected from the group consisting of fatty acids, styrene/maleic anhydride copolymer and phosphoric esters represented by the following formula (1):

(1)

wherein R is a linear or branched alkyl group of 1 to 30 carbon atoms, an alkoxy polyoxyalkylene group, a cycloalkyl group of 5 to 6 carbon atoms, a cycloalkyl group of 5 to 6 carbon atoms substituted by an alkyl group of 1 to 10 carbon atoms, and a group formed by bonding an alkyleneoxy group having from 1 to 10 repeating units each having 2 to 3 carbon atoms to an alkyloxy group of 8 to 18 carbon atoms, and n is an integer of 1 to 2.

6. The process for producing an elastic polyurethane fiber according to claim 5, wherein a spinning dope is prepared by a method comprising dissolving or dispersing one or more treating agents selected from the group consisting of fatty acids, styrene/maleic anhydride copolymers, esterified products of a styrene/maleic anhydride copolymer and phosphoric esters to prepare a solution or dispersion liquid, the solution or dispersion being sprayed on or mixed with the metal compound particles to obtain the surface-treated metal compound particles with the treating agent in an amount of 0.5 to 10% by weight based on the metal compound particles; the surface-treated metal compound particles being mixed with the polyurethane solution to obtain the spinning dope; and the resultant dope is spun.

* * * * *